Sept. 20, 1971     M. A. KLAPPER     3,605,266
DEVICE FOR SIMULTANEOUSLY CLEANING AND CUTTING PIPES
Filed Oct. 2, 1969
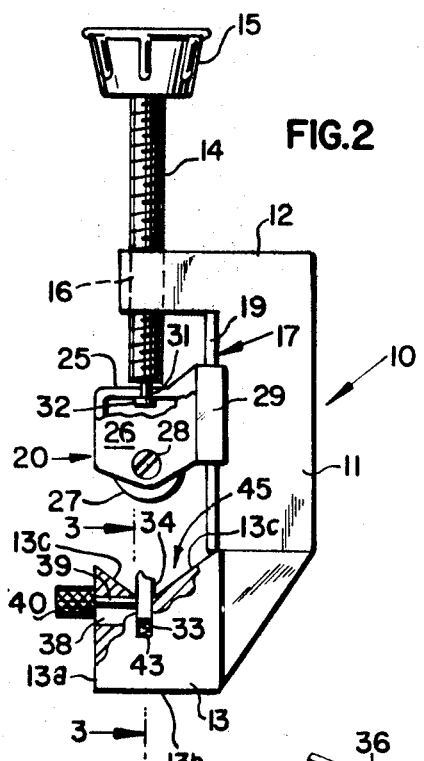
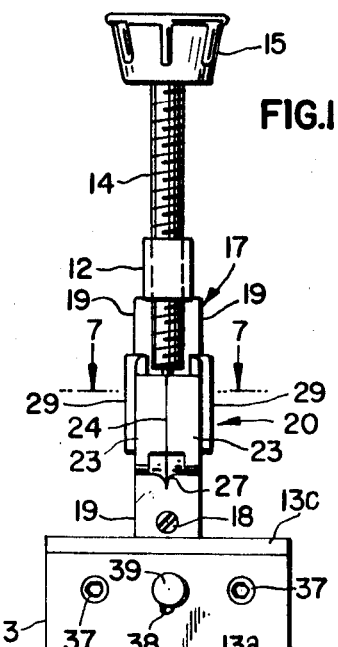
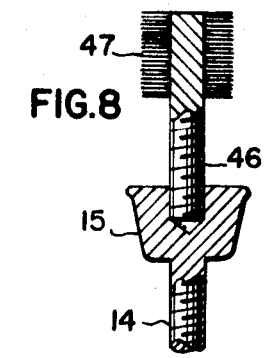
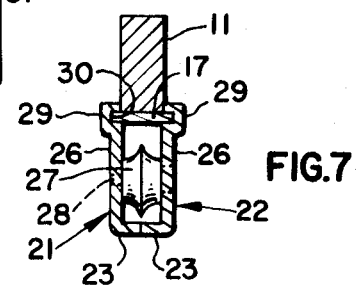
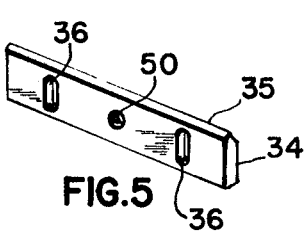
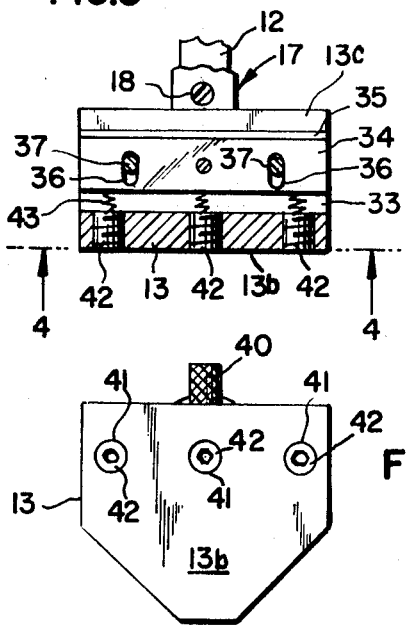
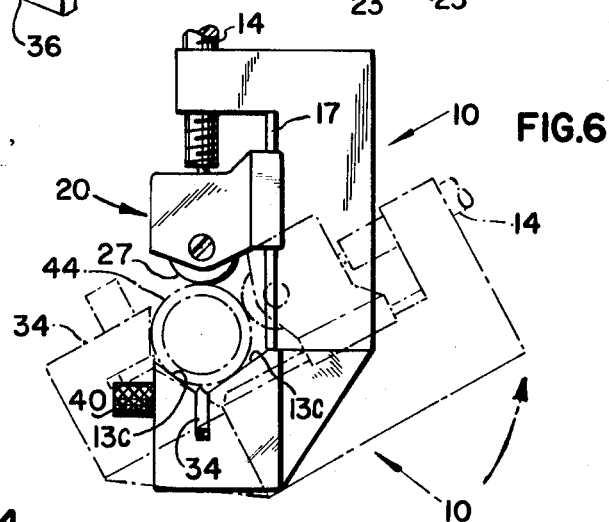
*INVENTOR.*
MARTIN A. KLAPPER
BY *J. Ledermann*
ATTORNEY United States Patent Office 3,605,266
Patented Sept. 20, 1971

3,605,266
DEVICE FOR SIMULTANEOUSLY CLEANING AND CUTTING PIPES
Martin A. Klapper, R.D. 6, Middletown, N.Y. 10940
Filed Oct. 2, 1969, Ser. No. 864,950
Int. Cl. B23d *21/10;* B08b *1/04*
U.S. Cl. 30—102                    2 Claims

ABSTRACT OF THE DISCLOSURE

A tool for cutting a pipe and simultaneously cleaning the outer surface of the pipe about the cut comprising a pipe cutter combined with a scraping or abrasive member lying in a plane at right angles to a cutter wheel of the pipe cutter.

---

The present invention is a tool, instrument or device provided with means for clamping a pipe between a cutter wheel and a pipe-cleaning member which may be a blade or other equivalent scraping or abrasive member lying in a plane at right angles to the cutter wheel and preferably positioned, with respect to the latter, so that the pipe is engaged at opposite ends of a diameter of the pipe. The instant tool is applicable to pipes made of any suitable metal or alloy, of which copper and galvanized iron are cited as examples, as well as to non-metallic pipes.

Referring briefly to the accompanying drawing, FIG. 1 is a front view of a tool made in accordance with the present invention.

FIG. 2 is a side view of the tool, with parts broken away and partly in section.

FIG. 3 is a fragmentary sectional view taken on the line 3—3 of FIG. 2.

FIG. 4 is a bottom plan view as seen in the direction of the arrows 4—4 of FIG. 3.

FIG. 5 is a perspective of a pipe-cleaning member per se in the form of a blade.

FIG. 6 is a fragmentary view illustrating how the tool is rotated about a pipe for simultaneously cutting and cleaning it.

FIG. 7 is a sectional view taken on the line 7—7 of FIG. 1.

FIG. 8 is a fragmentary sectional view showing a modified handle structure with a rotary brush secured thereto for cleaning the inside of a pipe fitting into which a section of the cut pipe is to be fitted.

Referring in detail to the drawing, the approximately U-shaped frame of the tool is designated by the numeral 10; the frame includes the elongated base or back member 11 and the two opposed arms or end members 12 and 13. A threaded feed stem or screw 14, provided with a hand grip or handle 15, registers in a complementarily threaded passage 16 extending through the arm 12.

The back member 11 is provided on its front face with a plate 17 secured thereto in any manner, as, for example, by means of screws 18. This plate has a greater width than the back member so that its side edges 19 project beyond the side edges of the member to provide rails. Obviously an equivalent of the rails 19 may be provided by having the plate 17 an integral part of the back member.

A slide or carriage 20 is shown split into two parts or wings 21, 22 along the line 24. These wings are mutually complementary and each includes a front wall 23, a top wall 25, and side walls 26. Between the side walls 26 and projecting through the open bottom of the carriage, a cutter wheel 27 is rotatably mounted on a shaft 28. This shaft is preferably in the form of a stem having a screw head, as shown in FIG. 2, on one end, and screw threads on the opposite end to screw into a threaded hole in the wing opposite that in which the screw head is shown, whence the stem 28 also serves to lock the wings together. Such details of the stem 28 are not specifically illustrated as they are obvious to one skilled in the art. The side walls 26 of the carriage have extensions which are deformed as shown at 29 to provide grooves 30 in which the rails 19 register.

Complementary semi-circular gouges are made in the juxtaposed edges of the top walls 25, and through the circular passage thus provided a reduced extension 31 on the stem 14 projects into the carriage. On its extremity this extension has a disc 32 of sufficient diameter to permit the carriage to be slid toward the arm 12 upon unscrewing the stem 14.

Registering in and vertically (with respect to FIGS. 1 and 2) slidably mounted in a transverse groove 33 provided in the arm 13, is a pipe cleaner or pipe-cleaning member shown in the form of a unitary blade 34 having a sharpened straight edge 35. This blade extends equidistantly on both sides of the plane of the wheel 27 and is provided with suitably spaced vertically extending slots 36 therethrough. Allen guide screws 37 are shown extending through threaded holes through the front face 13a of the arm 13 and extending into the slots 36 to provide limits to the up and down movement of the blade. Intermediate the width of the face 13a, a slot 38 is provided through the said face communicating with the groove 33. A pin or the like 39 extending rigidly from the blade 34 passes through the slot 38 and is preferably provided externally with a head 40. The pin 39 may be screwed into the blade by means of a threaded end, not shown, thereon screwed into the complementarily threaded hole 50 in the blade.

At least two threaded holes 41 (three being shown in FIGS. 3 and 4) are provided, suitably spaced, through the bottom face 13b of the arm 13 in the plane of the blade slot 33, in which Allen screws 42 are shown registering. A compression spring 43 is positioned between each screw 42 and the blade 34 to urge the blade upward in its groove 33 against the pipe to be cleaned. Thus, after positioning the blade appropriately to the diameter of the pipe 44, FIG. 6, to be cut and cleaned, and with the pipe in position, the screws 42 are tightened to urge the sharpened edge of the blade against the pipe. The pin 39 serves to lower the blade manually between the limits provided by the slots 36 and against the force of the springs 43 to permit sliding the pipe into position from the side of the tool.

With the pipe 44 positioned as shown in FIG. 6, the tool is rotated about the pipe. This can be done by one man who holds the pipe in one hand while rotating the tool with the other hand. The sharp edge of the blade is thus maintained by the screws 42 and their springs 43 against the surface of the pipe which extends a distance equal to the length of the blade on either side of the plane of the cutter wheel 27. The stem 14 is of course screwed down to the appropriate position to cause the cutter wheel to work into the pipe as the tool is turned, and if and when necessary as the cut proceeds the stem is further tightened down.

Thus the tool cleans the pipe while cutting it in two, and when the pipe is severed each section has its surface extending from the cutting plane clean and ready to be soldered or otherwise fixed in a fitting or in another pipe.

It is to be noted that what may be termed the upper face of the arm 13 is in the form of the two sloping sides of a transverse cut-out 45, and that the blade-receiving groove 33 is cut downward through the base of this cut-out. The two side walls 13c of the latter are smooth and preferably lie at an obtuse angle to each other. As seen in FIG. 6, the slidable engagement of the walls 13c with the pipe prevents the tool from separating from the pipe during rotation of the tool, for the lines of contact of the walls 13c with the pipe are spaced on opposite sides of the blade 34. The force of the springs 43 of course is made sufficient to urge the blade continuously into contact with the pipe.

Usually the inner surface of a fitting or another pipe into which a cut section is to be entered, also requires cleaning before the two parts may be soldered or sweated together. For this purpose a modified handle structure such as shown in FIG. 8 may be provided. A stem 46 having a stiff brush 47, preferably a cylindrical wire brush, is secured coaxially to the handle 15. It may be screwed into a socket in the handle, as shown, or permanently fixed thereto. If removably mounted in the handle, brushes of different diameters may be interchangeably attached to the handle to suit the internal diameters of fittings of various sizes.

What is claimed is:

1. A device for cutting a pipe and simultaneously cleaning the pipe on both sides of the cutting plane comprising an approximately U-shaped frame consisting of a base member having a first arm extending from one end thereof and a second arm extending from the other end thereof, a carriage slidably mounted on said base member for movement between said arms, means extending through said first arm and engaging said carriage for feeding said carriage in either direction between said arms, a cutter wheel carried by and projecting from said carriage in a direction toward said second arm, a pipe-cleaning member mounted in a plane at right angles to a plane through said wheel and in said second arm, said pipe-cleaning member extending substantially equidistantly on both sides of said plane through said wheel, the device being adapted to receive a pipe between said wheel and said pipe-cleaning member and to be rotated about the pipe to cause said wheel to cut said pipe and simultaneously to cause said pipe-cleaning member to clean the pipe on both sides of said plane through said wheel, said second arm including means for maintaining the device stable on the pipe during rotation of the device, said pipe-cleaning member comprising a unitary blade, said second arm having a transverse groove therein, said blade being slidably mounted in said groove in a direction toward or away from the base of said groove, said blade having spaced slots therein positioned transversely with respect to the length of the blade, guide screws extending through said second arm into said slots, threaded passages extending through said second arm in the plane of said groove, screws registering in said passages, and compression springs positioned between said last-mentioned screws and said blade.

2. A device according to claim 1, said second arm having a slot therein having a length substantially equal to the length of said first-named slots and being positioned between said guide screws, said blade having a stem secured thereto and extending through said last-named slot and projecting outward from said second arm for manually moving said blade toward said base of said groove against the action of said compression springs.

References Cited

UNITED STATES PATENTS

| | | | |
|---|---|---|---|
| 1,484,023 | 2/1924 | Hayter | 30—102 |
| 2,563,483 | 8/1951 | O'Hagan | 30—123X |
| 3,545,081 | 12/1970 | Butler | 30—102X |
| 3,355,749 | 12/1967 | Steffen | 30—123X |

ROBERT C. RIORDON, Primary Examiner

M. KOCZO, JR., Assistant Examiner

U.S. Cl. X.R.

15—104.04; 30—123